United States Patent [19]

Matsuba et al.

[11] Patent Number: 5,436,077
[45] Date of Patent: Jul. 25, 1995

[54] GLASS FLAKE HAVING DENSE PROTECTIVE COVERING LAYER

[75] Inventors: Teruo Matsuba, Mie; Yasuo Akano; Miwao Nishikawa, both of Kyoto, all of Japan

[73] Assignees: Nippon Glass Fiber Co., Ltd., Tsu; Hi-Mirror Co., Ltd., Maizuru, both of Japan

[21] Appl. No.: 72,847

[22] Filed: Jun. 7, 1993

[51] Int. Cl.⁶ .................................................. B32B 5/16
[52] U.S. Cl. ......................................... 428/404; 428/405; 428/406; 428/469; 428/701
[58] Field of Search ................ 428/403, 404, 405, 406, 428/323, 325, 336, 434, 433, 469, 472, 701, 702; 524/494

[56] References Cited

U.S. PATENT DOCUMENTS

| | | | |
|---|---|---|---|
| 3,291,633 | 12/1966 | Wissinger | 428/406 X |
| 3,535,019 | 10/1970 | Longlet et al. | 428/406 X |
| 4,574,109 | 3/1986 | Laroche | 428/325 |
| 4,609,587 | 9/1986 | Giordano et al. | 428/325 |
| 4,618,525 | 10/1986 | Chamberlain et al. | 428/209 |
| 4,916,014 | 4/1990 | Weber et al. | 428/403 |

FOREIGN PATENT DOCUMENTS

| | | |
|---|---|---|
| 55-165970 | 12/1980 | Japan. |
| 62-175045 | 11/1987 | Japan. |
| 3-25525 | 3/1991 | Japan. |

*Primary Examiner*—D. S. Nakarani
*Assistant Examiner*—H. Thi Lê
*Attorney, Agent, or Firm*—Kanesaka & Takeuchi

[57] ABSTRACT

A glass flake comprising a flake of glass having formed on its surface a metal covering layer on which is formed a dense protective covering layer of a metal oxide. The glass flake is produced by maintaining a flake of glass in an alkaline solution containing metal alkoxide, water and an alcohol, followed by the separation and firing thereof.

5 Claims, 1 Drawing Sheet

GLASS FLAKE HAVING DENSE PROTECTIVE COVERING LAYER

FIELD OF THE INVENTION

The present invention relates to a glass flake having a dense protective covering layer. In particular, it relates to a glass flake having a beautiful, dense protective covering layer which is highly excellent in water resistance, chemical resistance, etc., and is free from the problem of discoloration and fading.

DESCRIPTION OF THE RELATED ART

It has been practiced in various fields to obtain a coated surface assuming a metal-like appearance by use of a paint incorporated with various kinds of additives. For example, fine pieces of aluminum, synthesized pearl foils, metal-covered mica flakes, copper powders, etc. are incorporated into a paint to be used for the metallic coating of automobiles, or for the purpose of obtaining a coated surface that assumes an etching-like appearance.

A glass flake is a flat piece of glass. Paints and molding resins incorporated with glass flakes are known and have been in wide use. It is also known that glass flakes provided with a layer of metal assume a peculiar metallic color (see, for example, Japanese Utility Model Application (Laid Open) No. 175,045/87). Such metal-covered glass flakes are also incorporated into a paint (see, for example, Japanese Patent Application (Laid Open) No. 165,970/80).

In the hitherto known metal-covered glass flakes, one or more metal layers alone are formed on their surface. However, paints incorporated with such glass flakes suffer from the disadvantage that their color gradually changes and/or fades with the lapse of time in the presence of a corrosive substance, such as hydrogen sulfide, chlorine or the like and hence their beautiful glossy metallic appearance could not be maintained under such a circumstance. This is because the corrosive substance penetrates into the coated film, and part of the substance undergoes chemical reaction, thus causing corrosion of the surface of the metal covering. As a result, metallic appearance of the coated film disappears.

In order to solve the problem, there has been proposed a glass flake provided with a metal covering layer having thereon a protective covering layer of a translucent metal oxide (Japanese Utility Model Application (Laid Open) No. 25,525/91). This type of glass flake, however, is disadvantageous in that the flake assumes yellow color, which deepens With a decrease in their particle size. When a paint prepared from yellowish glass flakes provided with protective layers is coated, there is formed a paint film of which surface assumes yellow color and looks as if deteriorated.

OBJECT AND SUMMARY OF THE INVENTION

It is an object of the present invention to provide a glass flake having a dense protective covering layer which is excellent in water resistance and moisture resistance, does not undergo discoloration or fading even in the presence of a corrosive substance, such as hydrogen sulfide and chlorine, and at the same time is free from the problem of discoloration.

The present invention provides a glass flake which is provided with a metallic layer having formed thereon a dense protective layer of a metal oxide.

In the glass flake according to the invention, the metallic layer is covered with a dense protective layer of a metal oxide. Because of this, deterioration of the metallic layer can be prevented even when the flake is placed in a corrosive environment containing an acid, an alkali, hydrogen sulfide, chlorine, or the like. In addition, since the dense metal oxide is highly heat-resistant, the metal covering layer is hardly oxidized even when it is placed in an oxidizing atmosphere at an elevated temperature.

Since the water resistance and moisture resistance of an ordinary metal oxide layer is poor, a paint that contains a glass flake provided with a covering of an ordinary metal oxide suffers from undesirable whitening of paint film and deterioration in its gloss. To be more specific, ordinary metal oxide layers have fine pores due to insufficient density. Because of this, alkaline ingredients contained in the glass migrate through the metal oxide layer and accumulate in the interface of the paint vehicle and the glass. Since alkalis have an action of attracting water, water contained in the vehicle is attracted to, and accumulated in, the interface, thus causing undesirable whitening and deterioration in gloss.

The above problems can be solved, and improved water and moisture resistances can be attained by a dense protective covering layer capable of preventing the migration of the alkaline ingredients contained in the glass.

A dense protective covering of a metal oxide having no pores can be readily formed by means of firing according to the invention.

In addition, a glass flake provided with such a dense protective covering layer in accordance with the invention does not assume yellow color, and hence a beautiful paint film can be formed from a paint containing such a glass flake.

The glass flake according to the invention gives a gloss comparable to a pure metal foil, such as a foil of pure gold (specific gravity, 19.3) and of pure silver (specific gravity, 10.5). Accordingly, it can be used as a substitute for various metal foils, and it enables to reduce cost.

DESCRIPTION OF THE PREFERRED EMBODIMENT

Figure 1:
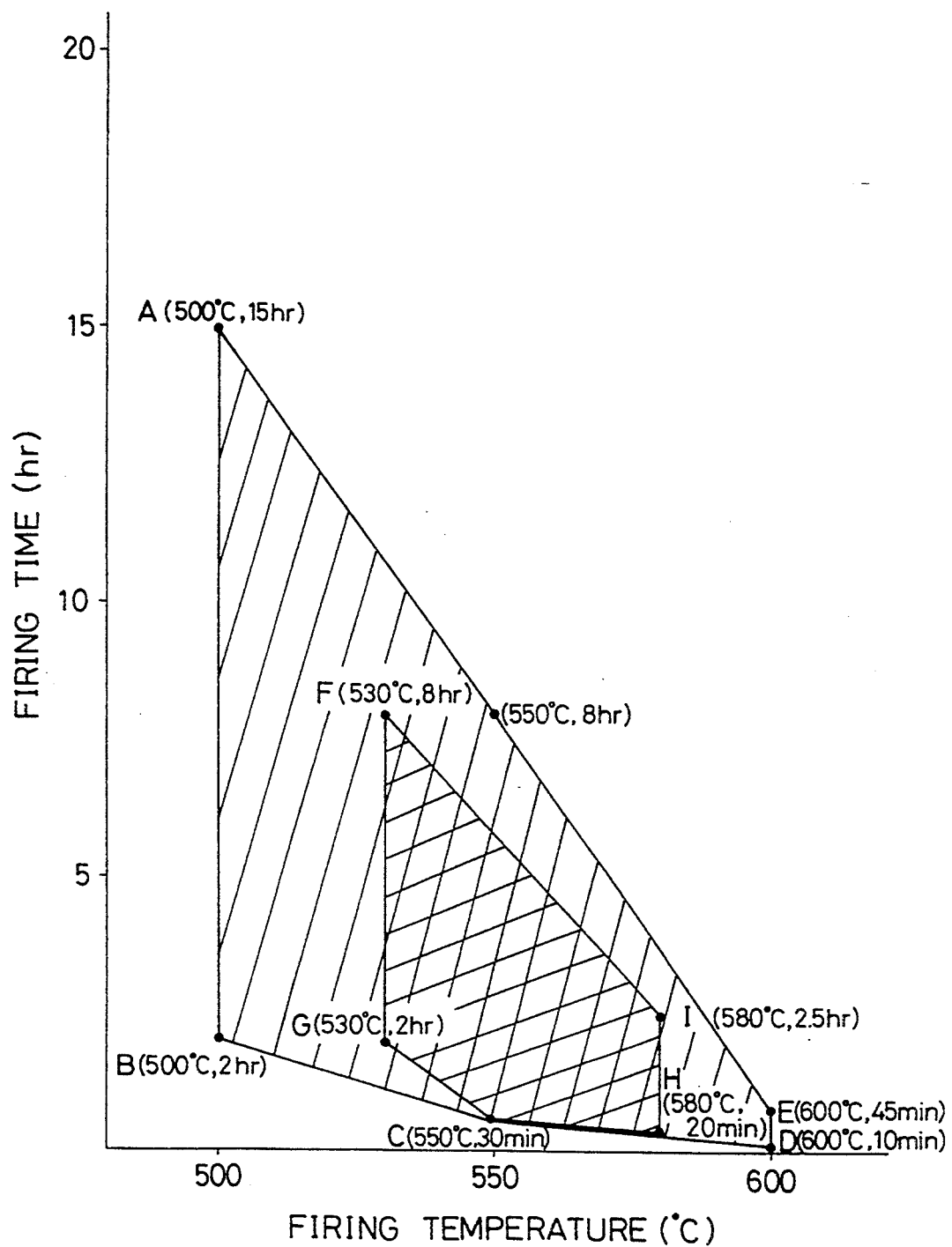
FIG. 1 is a graph showing suitable conditions for firing.

The present invention will further be illustrated hereinbelow.

The glass flake according to the invention is formed of a flake of glass having on its surface a metal covering layer having formed thereon a dense protective covering layer of a metal oxide.

The glass flake preferably has a diameter (or particle size in the direction perpendicular to the thickness) of about 10 to 1,000 μm, a thickness of about 0.1 to 10 μm, and an aspect ratio of 5 or above.

There is no particular restriction on the kind of glass to be used, and any conventional glasses can be employed, including, e.g., glasses used for conventional glass sheets, E-glass, lead glasses, and glasses for acid-resistant containers.

The metal covering layer formed on the flake of glass preferably has a thickness of formed 35 to 500 nm.

As examples of metals usable for the metal covering layer, mention may be made of noble metals, such as gold, silver and platinum, and base metals, such as nickel, copper, chromium and zinc. It is also possible to use an alloy of such metals.

There is no particular restriction on the method of forming the metal covering layer, and a suitable method can be selected in accordance with the kind of metal to be covered, and with the desired gloss and color tone. For example, a chemical plating (e.g., nonelectrode plating) can be employed.

The dense protective layer of a metal oxide preferably has a thickness of about 20 to 1,000 nm. The layer is preferably made of $SiO_2$, $SiO_2$-$Al_2O_3$, $Al_2O_3$, $TiO_2$, $ZrO_2$, or the like.

The dense protective layer can be formed preferably by using a metal alkoxide in accordance with the process of the present invention, in which a glass flake having formed thereon a metal covering layer is maintained for a predetermined period of time in an alkaline suspension containing a metal alkoxide, water and an alcohol, and the flake is then separated therefrom and subjected to firing.

As examples of usable metal alkoxides, mention may be made of alkoxysilane, such as tetraalkoxysilane represented by $(C_nH_{2n+1}O)_4Si$ (in which n is 1, 2 or 3), and the like. It is also possible to use aluminum isopropoxide, titanium isopropoxide, zirconium propoxide, acetylacetonatometals (e.g., acetylacetonatotitanium), and the like.

Any alcohol can be used in the above process, provided that it is miscible with water at room temperature. As examples of preferable alcohols, mention may be made of methanol, ethanol, propanol, and butanol. It is also possible to use a polyhydric alcohol.

As examples of preferable alkalis to be used to render the mixture of metal alkoxides, water and alcohols, mention may be made of ammonium, NaOH, KOH, $Na_2CO_3$, ethylenediamine, and the like.

The ratio (based on mole) of water to metal alkoxides to be admixed is preferably from 25 to 100 (water:metal alkoxides=25-100:1). In the mixture, alcohols are contained preferably at a percentage of 34% by weight or more (but less than 100%), in particular from 40 to 90% by weight. When the percentage is less than 34%, there may be resulted an incomplete mixing and the desired properties may not be attained, whereas a percentage greater than 90% could be disadvantageous with regard to cost.

It can be advantageous to at first admix a metal alkoxide, water and an alcohol, and then to supply glass flakes into the mixture. The glass flakes are supplied to the mixture preferably in an amount of about 100 to 1,000 parts, per 100 parts by weight of metal alkoxides. It can be advantageous with regard to the uniformity of the covering to adjust pH of the mixture after the supply of the glass flakes. (If desired, the mixture can be rendered alkaline prior to the supply of the glass flakes.) A pH in the range of from 10 to 12 can be particularly advantageous. When the pH is lower than 10, there may be resulted an undesirably low reaction rate. When the pH is higher than 12, there may be formed a metal oxide covering layer having poor density because of excessively high reaction rate.

After the supply of the glass flakes, the resulting mixture is stirred preferably in such a manner the glass flakes could remain unprecipitated. The dispersed state of the glass flakes is maintained preferably for 1 to 4 hours.

During the stirring, a metal oxide deposits on the surface of the glass flakes, thereby forming a film.

Thereafter, the glass flakes are separated from the liquid by an appropriate means, such as filtration, centrifugation, or the like. The separated glass flakes are then dried after being washed with water, where necessary.

The resulting glass flakes are then subjected to firing, whereby the deposited metal oxide layer is dehydrated and fine pores contained therein disappear. Thus, there can be obtained glass flakes having thereon a metal covering layer on which is formed a dense protective layer of a metal oxide. The temperature of the firing may be varied depending, e.g., on the kind of metal in the metal covering layer, and the kind of metal oxide in the metal oxide layer. In usual cases, the firing can be carried out at a temperature of about 500° to 600° C., in particular, 530° to 580° C. It can be preferred to conduct the firing for a period of time which falls in the region enclosed by A, B, C, D and E, in particular, in the region enclosed by F, G, C, H and I, shown in FIG. 1. When the firing temperature is too low and/or the firing period is too short, it will not be possible to fully attain the effect of increasing the density, which is a characteristic of the invention. On the contrary, when the firing temperature is too high and/or the firing period is too long, the metal in the metal covering layer may migrate into the glass layer in the form of colloid, thus causing the wearing of the metal covering layer and the disappearance of its metallic gloss. The region enclosed by F, G, C, H and I can be particularly preferred in the case where the glass flakes are coated with silver.

The glass flake provided with the dense protective covering according to the invention usually has a specific gravity in the range of from 3.5 to 4.5, and can be admixed quite easily with various matrixes. Since the flake can be oriented quite uniformly, there can be attained a sufficient gloss by using the flake in only a small quantity.

The surface of the glass flake according to the invention can be treated with, e.g., a silane coupling agent, in order to improve the wetting property and adhering property of the flake per se and of a paint containing the flake. Any silane coupling agent can be used for the treatment. As examples of usable silane coupling agents, mention may be made of vinyltris(2-methoxyethoxy)silane, vinyltriacetoxysilane, phenyltriethoxysilane, gamma-methacryloxypropyltrimethoxysilane, aminophenyltrimethoxysilane, gamma-aminopropyltriethoxysilane, N-beta-(aminoethyl)-gamma-aminopropyltrimethoxysilane, gamma-ureidopropyltriethoxysilane, trimethoxysilylpropyldiethylenetriamine, N-beta-(N-vinylbenzylaminoethyl)-gamma-aminopropyltrimethoxysilane hydrochloride, gammaglycidoxypropyltrimethoxysilane, gamma-mercaptopropyltrimethoxysilane, gamma-chloropropyltrimethoxysilane, and methyltrimethoxysilane.

The paint according to the invention is prepared by incorporating the glass flake provided with the dense protective covering into a film-forming composition. In the film-forming composition, there can be used any resin components hitherto used in the prior metallic paints, including, e.g., melamine-alkyd resins, thermosetting acrylic resins, acrylic lacquers, nitrocellulose lacquers, polyester resins, polyurethane resins, and the like. The composition may be prepared by incorporating various pigments and additives (for example, dispersing agents, antirunning agents, plasticizers, color separation inhibitors, etc.) into a vehicle.

The paint according to the invention contains the glass flake provided with the dense protective covering preferably in an amount of 0.05 to 20 parts by weight, per 100 parts by weight of solids contained in the paint. When the amount of the flake is less than 0.05 parts by weight, there will be resulted a coated film which is insufficient in gloss and is poor in decorativeness, whereas when it is more than 20 parts by weight, the dispersibility and the stability of the flake will be deteriorated, and there will be resulted a poor workability and an undesirable unevenness of the surface of coated film.

The paint according to the invention can be coated by any known coating method. It can however be most appropriate to utilize the conventional spray coating method. Upon spray coating, the paint is sprayed to form a thin, uniform film preferably having a thickness of about 5 to 100 μm. On the surface of the thus spray coated film, there may be additionally formed one or more layers of clear coating.

It can be advantageous to admix a liquid substance to a metal covered glass flake to enhance miscibility and uniformity dispersion among a metal covered glass flake and a paint resin. The liquid substance can be added to the metal covered glass flake treated with a coupling agent and dried in advance. Alternatively, the metal covered glass flake can be admixed to a mixture of the liquid substance and the coupling agent. The coupling agent may be gamma-aminopropyltorimethoxysilane, gamma-aminopropyltriethoxysilane, N-beta-aminoetyl-gamma-aminopropyltrimethoxysilane, gamma-glycidoxypropyltrimethoxysilane, vinyltriethoxysilane, gamma-methacryloxypropyltrimethoxysilane, titanium coupling agent, zirconium coupling agent, aluminum coupling agent, and the like.

The liquid substance should be liquid at a room temperature. The liquid substance is preferably neutral in order to protect the covered metal and to secure safety of handling work.

The liquid substance can be
hydrocarbon such as toluene and xylene;
alcohol such as ethyl alcohol;
ester such as ethyl acetate and butyl acetate;
ketone such as acetone and metyletylketone; and
glycol ether solvent such as etylene glycol ether, dietyleneglycol ether, propyleneglycol ether and the like.

It is also effective to use these solutions together with surface active agent and plasticizer.

In the case of preparing water paint, an inorganic substance which is desirably water is used as the liquid substance to moist. Water can be added with a surface active agent such as nonionic surface active agent (This is desirable because it does not substantially lowers stability of paint.), various emulsion, disinfectant, and fungicide etc.

The liquid substance can be admixed easily with the metal covered glass flake in a container with a turning type mixer (such as horizontal turning pipe type, V type, cubic type etc.), a container with a fixed type mixer (such as ribon type, screw type etc.), a kneading mixer, or bony mixer.

When the amount of the liquid substance is more than 0.5 wt % of the metal covered glass flake, there will have an effect on prevention of scattering (dusting). The amount of the liquid substance is preferably more than 2 wt %. It is preferable to use "oil absorption." (The oil absorption is a mixture of oil and the metal coated flake glass to make a mixture thereof where oil is added so far as the mixture does not separate oil therefrom when the mixture is left at rest.) The oil absorption is usually 20–100 parts by weight per 100 parts by weight of the metal coated flake glass, although it varies upon a shape of the glass flake. The liquid substance in an amount of less than 0.5 wt % is insufficient to prevent scattering of the flakes. When the liquid substance exceeds the oil absorption, the mixture of the flakes and the liquid substance tends to separate so that it becomes uneasy to handle the mixture.

Paints resin is preferably synthetic resin such as alkyd resin, amino resin, acrylic resin and epoxy resin. A natural resin such as rogin, cerac, cashew nut, dammar gum or the like is also prefereble. The liquid substance needs to be compatible with paints resins.

If necessary, it is possible to use a dispersion promoting agent as an ingredient added to a liquid substance. A well-known dispersion promoting agent such as phthalic ester etc. can be used. At this time, a dispersion promoting agent is selected while considering compatibility among used liquid substances, a solvent and a paint resin. For example, when the hydrocarbon of the mineral spirit etc. is used as a liquid substance, polyamide or fatty acid amide wax is used as a dispersion promoting agent. When water is used as the liquid substance, a surface active agent is used. An amount of the dispersion promoting agent is preferably 1–50 wt % calculated in the following:

--- a dispersion promoting agent/(a liquid substance + a dispersion promoting agent)

---

A mixing ratio of the metal covered glass flake to the paint resin (not containing both pigment and solvent) is preferably 0.1–120 parts by weight of a metal covered glass flake per 100 parts by weight of paint resin (not containing both pigment and solvent). Especially, it is preferable that the mixing ratio is 0.25–50 parts by weight per the paint resin (not containing both pigment and solvent). It is preferable that a mixing ratio of the metal covered glass flake of the present invention is 50–100 parts by weight per 100 parts by weight of solids contained in the liquid. The metal covered glass flake of a high scattering property is moisted by the liquid substance, so that scattering thereof is protected at a working environmental field.

The paint comprising the moist metal covered glass flake according to the invention is especially advantageous to use as a reinforced material to form the film protecting corrosion. Main use thereof is the field related to print such as metallic paint of the car or architecture, a signboad; nightglow reflected paint; seal; lighting implement, gravure printing; ink etc., the field related to the decoration such as the stage dress; display; interior, the field related surface decoration such as household Buddhist altar, Buddhist altar things; the field of arts and crafts such as replica; artcraft; gold lacquer etc., the field of a container decoration such as a make up container; a food container, the exterior field of exterior parts made from FRP, the ornament field of interior goods such as bathtub; toilet dressing table; furniture etc., and various field.

As stated hereinabove, the glass flake according to the invention has a gloss comparable to a metal and, hence, can be used as a substitute for various metal foils.

The glass flake according to the invention can be protected from deterioration (such as discoloration of the metal covering layer) even when it is placed in a corrosive environment containing an acid, an alkali, hydrogen sulfide, chlorine, or the like, since the metal layer is covered with a dense protective covering layer of a metal oxide. The flake is also excellent in water resistance, moisture resistance and heat resistance. In addition, the flake is free from the problem of yellowish discoloration.

The glass flake according to the invention can be readily produced in accordance with the process of the present invention.

Further, there can be formed by the paint according to the invention a highly beautiful, decorative, and high-grade coated surface provided with a metallic coating which is not only highly excellent in corrosion resistance, water resistance, moisture resistance and heat resistance, but also is free from yellowish discoloration and fading.

In particular, when the moist metal covered glass flake is used, a scattering of a metal covered glass flake is controlled. A working environment is improved. A yield of a metal covered glass flake is increased. Since each of the metal covered glass flakes is surrounded with the moist liquid substance in advance, the metal covered glass flake can be dispersed uniformly into paint so that processing time is reduced.

The present invention will further be illustrated by way of examples and comparative examples.

EXAMPLE 1

To a mixture of 30 ml of tetraethoxysilane, 250 ml of ethyl alcohol and 200 ml of water was added 30 g of glass flakes having an average diameter (or length in the direction perpendicular to their thickness) of about 15 μm and an average thickness of about 2 μm and provided with a silver covering layer formed by plating silver at a thickness of 0.3 μm by means of nonelectrode plating. To the resulting mixture was added 7 ml of aqueous ammonia, during which the mixture was stirred with a stirrer. After the hydrolysis had been allowed to proceed for 3 hours, the flakes were collected by filtration, washed with water, dried, and then fired at 550° C. for 1 hour, to give silver coated glass flakes having formed thereon a covering layer of $SiO_2$. It was confirmed by observing the flakes under a scanning electron microscope that a protective $SiO_2$ covering layer of a thickness of about 0.1 μm had been formed on the plated silver layer.

In order to improve the adhesion with paint resins, the flakes were subjected to a surface treatment in the following manner. At first, 100 parts by weight of aqueous 1% (based on weight) methylethoxysilane solution was prepared by adding water to 1 part by weight of methyltrimethoxysilane (A-163 produced by Japan Unicar Co., Ltd.) and then stirring the resulting mixture at room temperature for 30 minutes. Then, 50 parts by weight of the thus prepared aqueous solution of methyltrimethoxysilane was sprayed over the whole surface of 100 parts by weight of the silver plated, $SiO_2$-covered glass flakes, and the sprayed flakes were well admixed for 5 minutes. The resulting flakes were dried at 120° C. for 8 hours and then passed through a sieve having an opening of 32 μm.

Flakes which passed through the sieve was subjected to the following alkali dissolution test. Results obtained are shown in Table 1.

Alkali Elusion Test

Into a 300 ml Erlenmeyer flask containing 100 ml of pure water (pH 6.8) was charged 5 g of the flakes, and the contents were boiled for 10 minutes. After cooling, pH of the supernatant was measured, and the appearance of the sample was observed by the naked eyes.

EXAMPLES 2–7

Comparative Examples 1–5

The procedure of Example 1 was repeated, except that the firing was conducted under conditions set forth in Table 1. The glass flakes obtained were subjected to the same alkali dissolution test.

Results obtained are shown in Table 1.

TABLE 1

| | Firing Conditions | | | |
|---|---|---|---|---|
| | Temperature (°C.) | Time (hr.) | PH Value | Appearance |
| Comparative Example 1 | 200 | 1 | 10.1 | Silver |
| Comparative Example 2 | 300 | 1 | 10.1 | Silver |
| Comparative Example 3 | 400 | 1 | 10.3 | Silver |
| Comparative Example 4 | 500 | 1 | 10.0 | Silver |
| Example 1 | 550 | 1 | 6.8 | Silver |
| Example 2 | 550 | 0.6 | 8.0 | Silver |
| Comparative Example 5 | 600 | 1 | 7.3 | Silver tone disappeared |
| Example 3 | 595 | 0.5 | 6.8 | Silver |
| Example 4 | 550 | 1.5 | 6.8 | Silver |
| Example 5 | 520 | 3 | 6.9 | Silver |
| Example 6 | 520 | 10 | 6.8 | Silver |
| Example 7 | 580 | 0.5 | 6.8 | Silver |

It would be apparent from Table 1 that the glass flakes subjected to the firing according to the invention are excellent in water resistance and free from the problems of the dissolution of alkalis, and the discoloration or fading.

The degree of yellowness of the glass flakes obtained in Example 1 and Comparative Example 1 were determined in the manner set forth below since the yellowish appearance of glass flakes can be quantitatively analyzed in terms of the degree of yellowness. Results obtained are shown in Table 2.

It would be apparent from Table 2 that the glass flakes provided with a dense covering formed by firing at an elevated temperature in accordance with the process of the invention show a marked improvement in the problem of yellowish appearance.

Determination of the Degree of Yellowness

Glass flakes were analyzed by a colorimeter (model "Z-1001 DP" manufactured by Nippon Denshoku Kogyo Co., Ltd.). The degree of yellowness N was calculated in accordance with the following formula:

$$N = \frac{100 \times 128X - 1.60Z}{Y}$$

(in which X, Y and Z each represents one of the three stimulation values in the XYZ system). A larger N value means a greater yellowness.

TABLE 2

| | Degree of Yellowness |
|---|---|
| Example 1 | 27.0 |
| Comparative Example 1 | 39.1 |

EXAMPLE 8

A paint was produced by using the glass flakes prepared in Example 1 according to the paint composition set forth below.

| Composition of Paint | (g) |
|---|---|
| Glass flake (silver plated glass flake formed with a covering of SiO2): | 2.0 |
| "Super Glymine #1000 Clear" (trade name by Shinto Paint Co., Ltd.): | 40 |
| "N-thinner #144" (Shinto Paint Co., Ltd.): | 20 |

The thus obtained paint was coated on a steel plate at a thickness of 100 μm, set at 60° C. for 5 minutes, heated at 160° C. for 15 minutes and then allowed to cool. The chemical resistance of the resultant coated plate was tested according to the test methods set forth below. Results obtained are shown in Table 3.

Test for Chemical Resistance (Hydrogen sulfide)

After a piece of the coated plate had been dipped in an aqueous 0.5% solution of $(NH_4)_2S_x$ at room temperature for 24 hours, its appearance was observed by the naked eyes.

Test for Chemical Resistance (Chlorine)

After a piece of the coated plate had been dipped in an aqueous 2.5% NaClO solution at room temperature for 24 hours, its appearance was observed by the naked eyes.

Comparative Example 6

The procedure of Example 8 was repeated, except that silver plated glass flakes not provided with a covering of $SiO_2$ was used instead of the silver plated glass flakes provided with the covering of dense $SiO_2$. Results obtained are shown in Table 3.

TABLE 3

| | Hydrogen Sulfide | Chlorine |
|---|---|---|
| Example 8 | No change | No change |
| Comparative Example 6 | Blackened | Blackened |

It would be apparent from Table 3 that the coated films according to the invention are by far excellent in chemical resistance.

Comparative Example 7

A coated plate was prepared in accordance with the procedure of Example 8, except that the glass flakes prepared in Comparative Example 4 were used. The water resistance of a piece of the resulting coated plate and a piece of the coated plate obtained in Example 8 was determined according to the test method as set forth below.

Test for Water Resistance

After a piece of coated plate had been immersed in a pure water of 80° C. for 24 hours, its appearance was observed by the naked eyes.

Results obtained are shown in Table 4.

TABLE 4

| | Results |
|---|---|
| Example 8 | No change was observed |
| Comparative Example 7 | Deteriorated (Whitened) |

EXAMPLE 9

60 parts by weight of n-butyl Cellosolve (a trade name of UCC, a liquid substance for moisting) was admixed with 40 parts by weight of dioctylphthalate (dispersion promoting agent), whereby a moist liquid MA-1 was prepared. 80 parts by weight of the metal covered glass obtained in EXAMPLE 1 was admixed within the thus obtained 20 parts by weight of the moist liquid MA-1. The moist metal covered glass flake thus obtained was examined about scattering rate and paint dispersion thereof by the following methods. For comparison, a metal covered glass flake without a moist liquid glass flake MA-1 was examined by the same methods. Results obtained are shown in Table 5.

TABLE 5

| The presence or absence of moisting | the scattering rate (%) | dispersion |
|---|---|---|
| The presence | 0.9 | not detection |
| The absence | 28.8 | 8 |

Method of Scattering Rate Test (Dustability Test)

An equipment was used. The equipment has a cylindrical main pipe and a branch pipe. The main pipe has an entrance at the top end and a receiving dish of fallen substance at the bottom end thereof. The branch pipe extends to a horizontal direction from the side of this main pipe. The branch pipe was connected to the aspiration equipment via a filter. While the main pipe was being aspired by way of the branch pipe, 50 g of the sample fell from the entrance of the top end of the main pipe. If scattering of the flake is high, a large amount of the flake is let out of the branch pipe with aspiration so that the amount of falling on a receiving dish at the end of low is little. As scattering of the flake becomes lower, the amount of the flake falling down on the receiving dish becomes more. The scattering rate (dustability) was calculated under the following formula based upon the weight W (g) of the sample fallen on the receiving dish.

The scattering rate (%) = $[(50-W)/50] \times 100$

It would be apparent from Table 5 that a scattering of a moist metal covered glass flake is greatly improved. Namely, since the metal covered glass flake is adhere mutually by the liquid substance so as to form a big lump, the scattering is prevented. Since the metal covered glass flake is individually surrounded by the moist liquid compatible with a paint, a dispersion into a paint becomes better, so that the flake is dispersed uniformly within a short time.

Dispersion Test 3 g of the moist metal covered glass flake is added with 10 g of butylacetate and mixed for 30 second. And then, 11 g of butylacetate, 30 g of thermosetting acryl resin ("Super Glymin #1000 Clear" produced by Sinto Paint Co., Ltd.) and 0.1 g of silane-coupling agent (silane-coupling agent "A-187" produced by Japan Unicar Co., Ltd.) are added and mixed for 1.0 minute to prepare paint. The paint is applicated by an applicator on a glass plate to form a film of thickness 100 μm. After the film on the glass is set at 60° C. for 5 minutes, and then it is heated at 160° C. for 10 minutes to thermo-set. The surface of the film thus thermo-set is observed with an optical microscope of 50 times. The film was examined at five views selected optionally. Numbers of a lump of a glass flake (an aggregation consisted of glass flakes more than 3 pieces) are counted in every view.

What is claimed is:

1. A glass flake comprising:
    a flake of glass, said flake having a diameter of 10 to 1,000 micrometer, a thickness of 0.1 to 10 micrometer and an aspect ratio not smaller than 5,
    a metal covering layer formed on the flake of glass and having a thickness of 35 to 500 nm, said metal covering layer being formed of a material selected from a group consisting of gold, silver, platinum, nickel, copper, chromium, zinc and an alloy thereof, and
    a protective covering layer made of $SiO_2$ uniformly formed on the metal covering layer without pores therein.

2. The glass flake as claimed in claim 1, wherein the thickness of said dense protective covering layer is 20 to 1,000 nm.

3. The glass flake as claimed in claim 1 wherein said flake with the protective layer has a specific gravity of 3.5 to 4.5.

4. The glass flake as claimed in claim 1, wherein the surface of said protective covering layer is further treated with a silane coupling agent.

5. The glass flake according to claim 1, wherein said glass flake consists essentially of said flake of glass, said metal covering layer and said $SiO_2$ covering layer.

* * * * *